United States Patent [19]

Hayashi

[11] Patent Number: 4,657,180
[45] Date of Patent: Apr. 14, 1987

[54] PASSENGER CABIN HEATING SYSTEM

[75] Inventor: Yoshimasa Hayashi, Kamakura, Japan

[73] Assignee: Nissan Motor Co., Ltd., Yokohama, Japan

[21] Appl. No.: 595,537

[22] Filed: Mar. 30, 1984

[30] Foreign Application Priority Data

Apr. 27, 1983 [JP] Japan .................................. 58-73000

[51] Int. Cl.⁴ ............................................... B60H 1/02
[52] U.S. Cl. .............................. 237/12.3 R; 123/41.21
[58] Field of Search ................ 123/41.2, 41.21, 41.24, 123/41.25; 237/12.3 B, 12.3 A, 12.3 C, 2 A

[56] References Cited

U.S. PATENT DOCUMENTS 1,424,664 8/1922 Mallory .......................... 237/12.3 B

FOREIGN PATENT DOCUMENTS 0041853 5/1981 European Pat. Off. .
409816 5/1910 France ........................... 237/12.3 B
697859 9/1953 United Kingdom .

Primary Examiner—Henry Bennett
Attorney, Agent, or Firm—Schwartz, Jeffery, Schwaab, Mack, Blumenthal & Evans

[57] ABSTRACT

A passenger cabin heating system incorporated with a boiling liquid cooled-combustion engine is disclosed, which comprises a first passage connected to the coolant jacket of the engine a heat exchanger connected to the first passage for receiving therein the gaseous coolant of the coolant jacket to achieve heat exchanging between the gaseous coolant in the condenser and air surrounding the condenser, and a second passage extending between the heat exchanger and the coolant jacket for recirculating the coolant thus liquefied in the heat exchanger back into the coolant jacket.

8 Claims, 3 Drawing Figures

PASSENGER CABIN HEATING SYSTEM

BACKGROUND OF THE INVENTION

The present invention relates in general to a car heater for warming the passenger cabin of a motor vehicle, and more particularly to a passenger cabin heating system of a type which uses warmed coolant of the engine cooling system as its heat source.

Hitherto, there has been proposed an internal combustion engine of which cooling is effected by a boiling liquid cooling system. As will become apparent hereinafter, the cooling system basically features an arrangement wherein the coolant in the coolant jacket defined in the engine proper is permitted to boil and the gaseous coolant thus produced is passed out to an air cooled heat exchanger or condenser, and the coolant thus condensed and liquefied in the condenser is then recirculated back into the coolant jacket of the engine. Due to the effective heat exchanging carried out between the gaseous coolant in the condenser and the atmosphere, the cooling system exhibits a very high performance in cooling the engine.

SUMMARY OF THE INVENTION

It is an object of the present invention to provide a passenger cabin heating system which uses, as its heat source, the gaseous coolant produced in the above-mentioned boiling liquid cooling system.

According to the present invention, there is provided an improved passenger cabin heating system which is incorporated with a combustion engine cooled by a boiling liquid cooling system which includes a coolant jacket defined in the engine proper and containing therein a coolant, a condenser for condensing the gaseous coolant introduced thereinto from the coolant jacket and means for recirculating the coolant thus liquefied in the condenser back into the coolant jacket. The improved passenger cabin heating system comprises a first passage connected to the coolant jacket, a heat exchanger connected to the first passage for receiving therein the gaseous coolant to carry out heat exchange between the gaseous coolant in the condenser and air surrounding the condenser, and a second passage extending between the heat exchanger and the coolant jacket for recirculating the coolant thus liquefied in the heat exchanger back into the coolant jacket.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
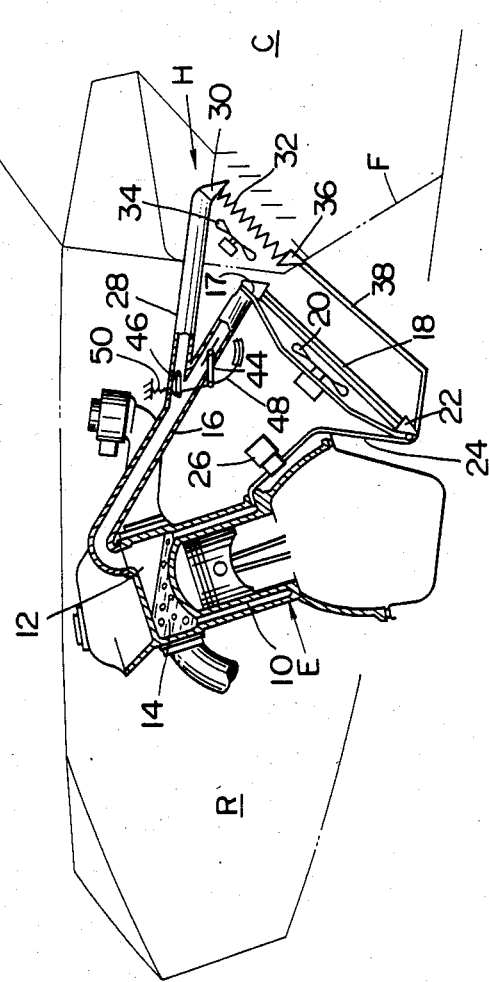
FIG. 1 is an illustration of an embodiment of the present invention, showing a vehicle cabin heating system incorporated with a boiling liquid cooled-internal combustion engine.

Referring to FIG. 1, there is shown a boiling liquid cooled-internal combustion engine equipped with a vehicle cabin heating system according to the present invention. As is understood from this drawing, the entire engine E and a part of the heating system H are mounted in the engine room R of the vehicle body. Designated by reference F is a fire board by which the engine room R and the passenger cabin C are bounded.

Prior to describing in detail the construction of the vehicle cabin heating system H of the present invention, the boiling liquid coolant system of the engine E will be outlined because the heating system H is closely incorporated therewith.

The cooling system comprises generally a coolant jacket 10 formed in the engine proper E. The coolant jacket 10 has at its upper portion an enlarged portion 12 merged therewith. The coolant jacket 10 contains therein a liquefied coolant 14 (for example, water), leaving an unoccupied space in the enlarged portion 12. A conduit tube 16 extends from the enlarged portion 12 to an upper tank 17 of a condenser 18. The condenser 18 is equipped with an electric fan 20 which produces air flow passing through the condenser 18. Extending from a lower tank 22 of the condenser 18 is a pipe 24 which leads to the coolant jacket 10. An electric feed pump 26 is mounted on the pipe 24 for pumping up the liquefied coolant in the condenser lower tank 22 into the coolant jacket 10. Although not shown in the drawing, a known electric means is associated with the feed pump 26 so that, under operation of the engine E, the feed pump 24 operates in such a manner that the level of the liquefied coolant in the coolant jacket 10 or 12 is kept constant.

In operation, the coolant 14 in the coolant jacket 10 is permitted to boil and the gaseous coolant thus produced passes out through the conduit tube 16 to the condenser 18 where the gaseous coolant is condensed and thus liquefied. During this condensation in the condenser 18, the coolant removes a large amount of heat thereby allowing this cooling system to have a high cooling efficiency. Subsequent to the condensation, the liquefied coolant is recirculated back into the coolant jacket 10 of the engine E through the pipe 24.

The vehicle cabin heating system H according to the present invention is incorporated with the above-mentioned cooling system in a manner as is described hereinbelow.

The heating system H comprises a conduit tube 28 branched from the afore-mentioned conduit tube 16 and leading to an upper tank 30 of a heater core 32. An electric fan 34 is located near the heater core 32 for producing air flow which passes through the heater core 32. Although not shown in the drawing, the heater core 32 and the electric fan 34 are housed in a heater casing which is located in the front portion of the passenger cabin C. Extending from a lower tank 36 of the heater core 32 is a pipe 38 which leads to the lower tank 22 of the aforementioned condenser 18. As is best seen from FIG. 2, first and second butterfly valves 40 and 42 are respectively mounted in the branched conduit tubes 16 and 28. The valves 40 and 42 have respective arms 44 and 46 pivotal therewith. As shown, the arm 44 is longer than the arm 46. The leading ends of the arms 44 and 46 are connected to a common control wire 48 which leads to a control knob (not shown) exposed to the passenger cabin C. Usually, the valve 40 is kept fully opened and the other valve 42 is kept fully closed by the work of a spring 50. However, when, upon requirement of heating of the passenger cabin C, the wire 48 is pulled in the direction of the arrow A to a certain extent against the force of the spring 50, the valve 40 is turned slightly to the position indicated by the broken line and the other valve 42 is largely turned to fully open the tube 28. It is to be noted that the valve 40 does not fully close the corresponding tube 16 even when the other valve 42 assumes its fully open position. This functional difference is owing to the dimensional difference between the arms 44 and 46.

In the following, operation of the vehicle cabin heating system H will be described.

Figure 2:
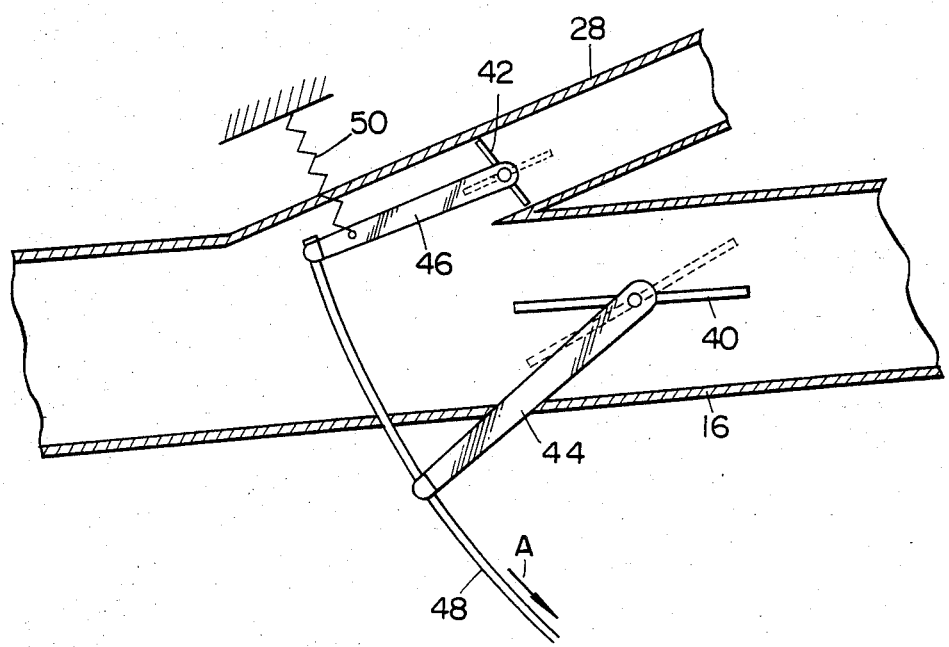
FIG. 2 is an enlarged sectional view of a valved portion of the vehicle cabin heating system of FIG. 1.

For ease with which the description is made, the description will be commenced with respect to the solid line-indicated condition of FIG. 2 wherein the conduit tube 16 is fully open and the other tube 28 is fully closed.

When, upon starting of the engine, the level of the liquefied coolant 14 in the coolant jacket 10 is below the predetermined level, the feed pump 26 becomes operated to pump up the coolant in the condenser lower tank 22 into the jacket 10 to raise the level to the predetermined level. When, after starting, the engine is still cold, boiling of the coolant 14 does not occur. Thus, under this cold condition, the level does not change or lower, so that the feed pump 26 halts causing the coolant 14 in the coolant jacket 10 to stationarily stay therein. After a while, boiling of the coolant 14 starts at particularly heated portions, such as the portions defining the combustion chambers and the exhaust ports. It is to be noted that the engine under this condition is already ready for practically operating the vehicle cabin heating system H. That is, when the boiling of the coolant 14 starts, the operator or driver of the vehicle handles the control knob to pull the control wire 48. With this handling, the valve 42 turns to fully open the tube 28 and the valve 40 turns slightly to slightly close the tube 16, as is shown by the valves illustrated by the broken lines in FIG. 2. Thus, the vapor produced in the coolant jacket 10 flows into not only the condenser 18 but also the heater core 32, so that, under energization of the electric fan 34, warmed air is blown into the passenger cabin C from the heater core 32. The coolant thus cooled and condensed in the heater core 32 flows into the lower tank 22 of the condenser 18. The liquefied coolant in the condenser lower tank 18 is then recirculated back into the coolant jacket 10 of the engine E through the pipe 24 in the manner as is described hereinbefore.

Figure 3:
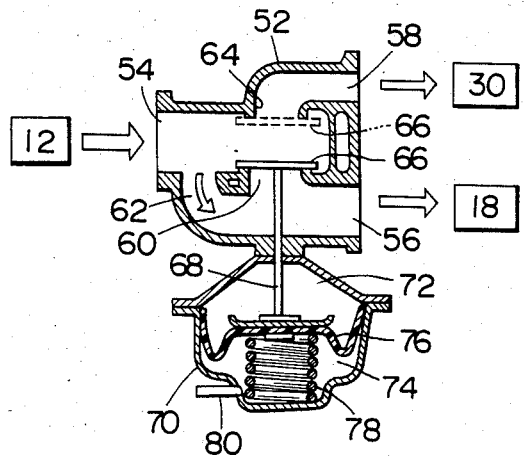
FIG. 3 is a sectional view of a valve member which is replaceable with the valved portion of FIG. 2.

Referring to FIG. 3, there is shown a valve member which can be used as a substitute for the valved portion of FIG. 2. The valve member comprises a casing 52 defining therein first, second and third passages 54, 56 and 58 which are merged in the casing 52. The first, second and third passages 54, 56 and 58 are respectively connected to the outlet of the engine coolant jacket 12, the upper tank (no numeral) of the condenser 18 and the upper tank 30 of the heater core 32. The connection between the first and second passages 54 and 56 is made through both a major opening 60 and a bypass opening 62, while the connection between the first and third passages 54 and 58 is made through a single opening 64. A valve head 66 is received in the casing 52, which is movable from a first position (indicated by the broken line) where it closes the opening 64 to a second position (indicated by the solid line) where it closes the major opening 60. The valve head 66 has a rod 68 which extends therefrom to a vacuum motor. The motor comprises a casing 70 of which the interior is divided into two chambers 72 and 74 by a diaphragm member 76 to which the rod 68 is connected. A spring 78 is disposed in the chamber 74 to bias the diaphragm member 76 toward the other chamber 72, so that usually, the valve head 66 is kept in the first position (indicated by the broken line). The chamber 74 is connected through a tube 80 to a vacuum producing portion of the engine. Although not shown in the drawing, the tube 80 is equipped with a known control valve of which operation is remotely controlled from the passager cabin C. Thus, when, under operation of the engine, the control valve is operated to open the tube 80, vacuum is applied to the chamber 74 to move the valve head 66 to the second position (indicated by the solid line). Under this condition, the vapor or gaseous coolant produced in the coolant jacket 10 is fed into the heater core 32 as well as the condenser 18 thereby to warm the passenger cabin C.

As will be understood from the above description, in the present invention, the vapor or gaseous coolant which is instantly produced at the particularly heated portions of the engine can be used as a so-called "initial heat source" of the heating system H. Thus, the heating system H assures rapid warm up thereof, so that the passengers in the vehicle cabin can enjoy warmed air quickly when the engine starts under cold condition. This rapid warm up of the heating system is highly evaluated when considering the widely used conventional car heater which uses, as its heat source, the warmed water of the engine cooling system. That is, the conventional heating system is weak in effecting the rapid warm up because of its inherent construction using the warmed water in liquid state as its heat source.

What is claimed is:

1. In a motor vehicle powered by a combustion engine cooled by a boiling liquid cooling system which includes a coolant jacket defined in the engine proper and containing therein a coolant, a condenser for condensing the gaseous coolant introduced thereinto from said coolant jacket through a conduit and recirculating means for recirculating the coolant thus liquefied in the condenser back into the coolant jacket;

a passenger cabin heating system comprising:
a first passage connected to said conduit;
a heat exchanger located in the passenger cabin of said vehicle and connected to said first passage for receiving therein the gaseous coolant to achieve heat exchanging between the gaseous coolant in the heat exchanger and air surrounding the heat exchanger; and
a second passage extending between said heat exchanger and the coolant jacket for recirculating the coolant thus liquefied in said heat exchanger back into the coolant jacket; and
valve means associated with both said conduit and said first passage for simultaneously controlling both the flow rate of gaseous coolant directed to said condenser and that of gaseous coolant directed to said heat exchanger, said valve means having a position wherein said first passage is completely closed;
wherein said valve means provides a controlled flow through said conduit at all times; and
wherein said valve means comprises a first butterfly valve pivotally disposed in a passage extending between said coolant jacket and said condenser, a second butterfly valve pivotally disposed in a passage extending between said coolant jacket and said heat exchanger, and synchronizing means for achieving synchronized movements between said first and second butterfly valves.

2. In a motor vehicle powered by a combustion engine cooled by a boiling liquid cooling system which includes a coolant jacket defined in the engine proper and containing therein a coolant, a condenser for condensing the gaseous coolant introduced thereinto from said coolant jacket through a conduit and recirculating means for recirculating the coolant thus liquefied in the condenser back into the coolant jacket;

a passenger cabin heating system comprising:

a first passage connected to said conduit;

a heat exchanger located in the passenger cabin of said vehicle and connected to said first passage for receiving therein the gaseous coolant to achieve heat exchanging between the gaseous coolant in the heat exchanger and air surrounding the heat exchanger; and a second passage extending between said heat exchanger and the coolant jacket for recirculating the coolant thus liquefied in said heat exchanger back into the coolant jacket; and valve means asociated with both said conduit and said first passage for simultaneously controlling both the flow rate of gaseous coolant directed to said condenser and that of gaseous coolant directed to said heat exchanger, said valve means having a position wherein said first passage is completely closed;

wherein said valve means provides a controlled flow through said conduit at all times and comprises a valve member which includes:

a casing defining therein first, second and third passages which are mutually merged and respectively connected to the coolant jacket, the condenser and the upper tank of the heater core;

a bypass means defining a bypass passage between said first and second passages;

a valve head movable from a first position where it blocks the communication between the first and third passages to a second position where it blocks the communication between said first and second passages; and a vacuum motor operatively connected to said valve head and operating the same in such a manner that upon application of vacuum thereinto, it causes said valve head to assume said second position, while, upon discharging of vacuum therefrom, it causes said valve head to assume said first position.

3. A passenger cabin heating system as claimed in claim 1, further comprising biasing means for biasing said first and second butterfly valves to assume their fully open and fully closed positions, respectively.

4. In a motor vehicle powered by a combustion engine cooled by a boiling liquid cooling system which includes a coolant jacket defined in the engine proper and containing therein a coolant, a condenser for condensing the gaseous coolant introduced thereinto from said coolant jacket through a conduit and recirculating means for recirculating the coolant thus liquefied in the condenser back into the coolant jacket;

a passenger cabin heating system comprising:

a first passage connected to said conduit;

a heat exchanger located in the passenger cabin of said vehicle and connected to said first passage for receiving therein the gaseous coolant to achieve heat exchanging between the gaseous coolant in the heat exchanger and air surrounding the heat exchanger; and a second passage extending between said heat exchanger and the coolant jacket for recirculating the coolant thus liquefied in said heat exchanger back into the coolant jacket; and valve means associated with both said conduit and said first passage for simultaneously controlling both the flow rate of gaseous coolant directed to said condenser and that of gaseous coolant directed to said heat exchanger, said valve means having a position wherein said first passage is completely closed, and comprising a first butterfly valve pivotally disposed in a passage extending between said coolant jacket and said condenser, a second butterfly valve pivotally disposed in a passage extending between said coolant jacket and said heat exchanger, synchronizing means for achieving synchronized movements between said first and second butterfly valves, and biasing means for biasing said first and second butterfly valves to assume their fully open and fully closed positions, respectively, said synchronizing means comprising a first arm connected to said first butterfly valve to move therewith, a second arm connected to said second butterfly valve to move therewith, and a control wire to which the leading ends of said first and second arms are connected.

5. A passenger cabin heating system as claimed in claim 4, in which said first arm is longer than said second arm.

6. A passenger cabin heating system as claimed in claim 4, in which said first butterfly valve is prevented from assuming its fully closed position even when said second butterfly valve assumes its fully open position.

7. A passenger cabin heating system as claimed in claim 1, in which the passages receiving therein said first and second butterfly valves are branched from a common tube which extends from said coolant jacket of the engine.

8. A passenger cabin heating system as claimed in claim 2, further comprising biasing means for biasing said valve head to assume said first postion.

* * * * *